Patented Sept. 20, 1949

2,482,307

UNITED STATES PATENT OFFICE 2,482,307

PROCESSING OF SYNTHETIC ELASTOMER LATICES

Herbert W. Walker, Woodstown, N. J., and Raymond W. Morrow, Wilmington, Del., assignors to E. I. du Pont de Nemours & Company, Wilmington, Del., a corporation of Delaware No Drawing. Application May 18, 1945, Serial No. 594,598

5 Claims. (Cl. 260—92.3)

This invention relates to an improvement in the processing of synthetic elastomer latices, and, more particularly, to a method for concentrating such latices and in driving off volatile constituents therefrom.

The water dispersions of the finely divided particles of synthetic elastomers prepared by emulsion polymerization, which are generally referred to as synthetic elastomer latices, often contain volatile constituents which may be detrimental to the resulting elastomer products produced from the latices. Also, where unpolymerized monomers still remain, they may be employed advantageously in subsequent polymerizations, provided a suitable method for recovering them from the latex can be devised. In cases where the latex is to be employed in certain uses, such as, for instance, in froth sponge manufacture, it is often necessary to concentrate the latex, and the most direct method for driving off some of the water would be by distillation. Because of the surface-active agents which are normally present in latices, it has been found that an excessive amount of foam is produced on distilling such latices at normal or reduced pressures, thereby making distillation extremely slow, or, in some cases, impossible. It will therefore be obvious that large economies in the processing of synthetic elastomer latices could be effected if it were possible to prevent foam formation during the distillation of these latices so as to permit stripping, and recovering where desirable, by rapid distillation of the unpolymerized monomers or other contaminating volatile materials, and, where desired, to permit concentration of the more dilute latices.

It is therefore an object of this invention to provide an improved process for effecting distillation of volatile materials from synthetic elastomer latices by incorporating therein materials which will effectively reduce or eliminate foaming during the heating or distillation operation. A further object of the invention is to provide a simple and rapid method for improving synthetic latices by stripping out unpolymeized monomers and odor-imparting or otherwise contaminating volatile constituents. A still further object of the invention is to provide an economical method for recovering, for re-use, polymerizable residues in synthetic elastomer latices. Another object is to provide an economical method for effecting concentration of synthetic elastomer latices by removing part of the water therefrom by distillation. A still further object of the invention is to provide improved compositions suitable for use in reducing and eliminating foaming during the heating or distilling of synthetic elastomer latices.

We have found that the synthetic elastomer latices prepared by emulsion polymerization of butadiene-1,3 compounds, including chloroprene, isoprene and interpolymers of the same with styrene and other modifying polymerizable materials, can be subjected to boiling at atmospheric, reduced or super-atmospheric pressures when there is incorporated therein a very small amount of polymeric dimethyl silicones dissolved in a water immiscible solvent for such silicone. The amount of silicone required for suppressing the foaming of these elastomer latices may be greatly reduced if it is dispersed in the latex, which is preferably brought about by dissolving the silicone, or at least part of it, in an organic solvent. The silicone is most effective when the solvent solution of the silicone is emulsified in aqueous medium before it is added to the latex. In producing the emulsion, it has been found that the size of the dispersed particles is very important, and they should not be smaller than 2 microns. With the more highly dispersed emulsions of the silicone solution, the silicone becomes much less effective. Since chloroprene itself is a solvent for the polymeric dimethyl silicone, it is the preferred solvent for this use where a chloroprene polymer latex is being processed. We have also found that the effectiveness of the polymeric dimethyl silicone is still further increased if it is dissolved in chloroprene and permitted to age for several days prior to its addition to the elastomer latex.

The polymeric dimethyl silicones which are suitable for use in this invention may vary from light oil-like liquids to heavy jellies or greases such as products which are today sold by the Dow-Corning Corporation under the designation of "Dow-Corning stop cock grease," "Dow-Corning plug cock grease," "Dow-Corning Type 200 fluid," "Dow-Corning Type 500 fluid," and "Dow-Corning ignition sealing grease."

These polymeric dimethyl silicones may be prepared by the methods more particularly disclosed in U. S. P. 2,258,218 and U. S. P. 2,286,763 to E. C. Rochow, or by the process of McGregor and Warrick U. S. P. 2,384,384.

The following examples are given to illustrate the invention. The parts or percentages used are by weight, unless otherwise specified.

*Example 1*

500 cc. of polychloroprene latex, which was a 50% dispersion of polychloroprene in an alkaline sodium abietate solution (approximately five days old), was heated to 60° C. in a 1 liter round bottom flask, and to this latex was added with gentle agitation 0.57 cc. of a chloroprene solution containing 10% of polysilicone grease and 0.1% of phenothiazine (thiodiphenylamine). There was thus introduced into the latex about 0.02% of the polysilicone, based upon the neoprene content of the latex. (The silicone grease used in this process is designated "Dow-Corning stopcock grease," penetrometer ASTM D217–41T–260.) The flask was connected with a water condenser fitted with a receiver and vacuum line leading to a vacuum pump. On reducing the pressure within the system to 150 mm. of Hg, boiling was established with only about one inch of foam on the surface of the latex. On heating the distilling flask with a water bath at 98° C., foam filled the flask and the distillation had to be discontinued. Without the added silicone, foam filled the flask even before boiling could be established by reduction of the pressure.

*Example 2*

100 grams of the chloroprene-silicone solution used in the above experiment was treated with 3 g. of oleic acid and emulsified in 97 g. of a water solution containing 5 g. of triethanolamine using an electric homogenizer of the Eppenbach type. 1.10 cc. of this emulsion was added to another 500 cc. portion of the same latex employed in Example 1, heated to 60° C. In this run the pressure was reduced to 150 mm. to establish boiling and a water bath at 95° C. was raised around the flask containing the latex to give a rapid distillation without foam.

The pressure was later reduced to 65 mm., still heating the latex in the 95° C. bath to concentrate the latex to over 60% solids, without trouble from foaming.

*Example 3*

An emulsion was made by pouring slowly 40 g. of a chloroprene-silicone grease solution described in Example 1 into 60 g. of a water solution containing 1.67% of potassium castor oil soap stirred by a high-speed propeller type electric stirrer (Hamilton-Beach). After stirring for 3 minutes, microscopic examination of a diluted portion of this emulsion revealed that the average particle size was of the order of 0.5 micron. All the particles showed rapid Brownian movement. When 0.84 cc. of this silicone emulsion was added to 300 cc. of aged latex like that used in Example 1 preheated to 58° C. (thus introducing 0.02% of silicone based on the neoprene content of the latex) and the pressure reduced, boiling could not be established owing to the large amount of foam that rapidly accumulated.

Another 0.84 cc. portion of the emulsified silicone was added to the latex. Foam formation was still excessive and the heated latex could not be brought to a boil without frothing by reducing the pressure. Upon the addition of a third portion of the silicone emulsion consisting of 1.68 cc., to give a total of 0.08% of silicone introduced, boiling took place at 150 mm. pressure without foaming, but on applying external heat, strong foaming occurred and concentration of the latex by distillation was impossible.

*Example 4*

Another emulsion of the chloroprene-silicone solution was made as in Example 3, except that the speed of the emulsifying stirrer was reduced. Under the microscope the particles of this emulsion were seen to be 2 to 30 microns in diameter, averaging about 6 microns and showing little or no Brownian movement. Treatment of a 300 cc. portion of the neoprene latex with 0.84 cc. of this emulsion resulted in a product that boiled evenly at 150 mm. Hg pressure in a water bath at 98° C. with practically no foam formation even when concentrated to 60% solids.

Thus, two silicone solution emulsions of identical chemical composition but differing in physical form vary widely in their effectiveness in suppressing foam; the one being over four times as efficient as the other, as judged by the amount of anti-foam agent required. The concentrated latex produced by the distillation is much improved in odor as compared with the starting material, owing to the removal of the constituents imparting an odor thereto, and the small amounts of unpolymerized chloroprene. By a suitable condensing system, the chloroprene is recovered. The concentrated latex is well adapted for use in making articles of neoprene froth sponge.

*Example 5*

When 300 cc. of the latex as employed in Example 1 was treated with 0.84 cc. of the silicone emulsion as produced in Example 4 and then steam distilled at 60° C. and at 150 mm. pressure, the latex was deodorized and stripped of the residual chloroprene monomer. The hot latex, somewhat diluted by condensation of the steam required in preheating, was cooled and restored to its original concentration by shutting off the steam and flash distilling at a reduced pressure of 20 mm. The silicone prevented excess foaming during the steam and flash distillations.

*Example 6*

To 550 g. of fresh (used within 6 hours after making neoprene (polychloroprene) later prepared as in Example 1 and preheated to 58° C., was added 2.2 cc. of a chloroprene-silicone stopcock grease (as used in Example 1) emulsion made as follows: 25 grams of freshly prepared chloroprene solution containing 10% of silicone grease and 0.1% of phenothiazine to which was added 1.5 g. of oleic acid, was emulsified in 72 g. of water bearing 1.5 g. of triethanolamine by mixing with an air-driven laboratory stirrer. The 2.2 cc. of silicone emulsion introduced about 0.02% silicone on the basis of the neoprene content of the latex. When the pressure was first reduced to 150 mm., boiling with but little foam occurred, but immediately after the hot water bath at 98° C. was raised around the flask, strong foaming began and the distillation had to be stopped. In the absence of the silicone, foam overflowed the flask at a much higher pressure than 150 mm.

*Example 7*

Another emulsion was made in the same manner, using a chloroprene-silicone-phenothiazine stabilized solution of the same composition as in Example 6, but which had been aged at room temperature for 30 days. When 550 g. of the same fresh latex was treated, as outlined in Example 6, with 2.2 cc. of a similarly prepared emulsion of this aged solution, the latex could be distilled with the external water bath raised well up around the flask without the formation of an interfering amount of foam.

*Example 8*

A 40% emulsion of a freshly made solution of chloroprene containing 10% silicone grease and 0.1% of phenothiazine in a 1.67% water solution of potassium castor oil soap was made with a low speed agitation as described in Example 4. 0.84 cc. of this emulsion, to give silicone equal to 0.02% of the neoprene content of the latex, was added to 300 cc. of a freshly made lot of neoprene latex (50%) preheated to 58° C., which was then subjected to reduced pressure. A boil with little foam was established but when external heat was applied to force the distillation, an excessive amount of foam formed that would have flooded the condenser. The silicone grease used in this run is known as "Dow-Corning plug cock grease," and has, according to the manufacturer, penetrometer, ASTM D217–41T–260.

Example 9

The run as described in Example 8 was repeated, using the same lot of fresh latex but an emulsion made with a solution of the same silicone in chloroprene, which solution had been stabilized with phenothiazine and aged at room temperature for 13 days. In this case, using the same amount of the silicone, the latex distilled satisfactorily with little or no foam, so that it could be concentrated to about 60% solids without difficulty.

Example 10

500 cc. of a polychloroprene latex, being an emulsion of polymerized chloroprene in an alkaline sodium rosinate solution containing about 36% solids and about 3% of unpolymerized chloroprene, was treated with 0.6% (based on the polymer) of a liquid polymethyl silicone added as a 10% solution in butyl chloride, which was added directly without previous emulsification. This silicone had a viscosity of approximately 1000 centistokes at 25° C., and analyzed as follows: C, 32.9%; H, 8.39%; Si, 33.8%; O, 24.6%. The value for the molecular weight obtained by the Rast method by freezing point in camphor was about 4000. This silicone is commercially known as "Dow-Corning Type 200 fluid.") This treated latex was distilled at 100 mm. Hg pressure in a water bath at 80° C. with an even boil, accompanied by no excess foam. 17 g. of chloroprene were recovered in a condenser cooled with a mixture of "Dry Ice" and alcohol.

Example 11

The latex described in Example 10 was similarly stripped of the unpolymerized chloroprene by pretreating the latex in the same manner as in Example 10, with 0.06% of a fluid polymethyl silicone having a viscosity of 0.65 centistokes (This material is sold as Dow-Corning Type 500 fluid.)

Example 12

A 1000 g. portion of a polymerized emulsion, containing a chloroprene-isoprene interpolymer and unpolymerized monomers in an acid solution of the sodium salt of the sulfate ester of oleyl acetate and the sodium salt of the condensation product of formaldehyde and naphthalene sulfonic acids, was treated with 0.02% (based on the starting monomers) of silicone stopcock grease added as a 10% solution in Dependip, without preliminary emulsification. (Dependip is a petroleum oil cut having a boiling range of from 117° to 140° C., available for use as a solvent, such as in making natural rubber cements.) The treated latex was distilled under a pressure of 400 mm., which was gradually reduced to 200 mm. by heating externally with a water bath. 73 g. of unpolymerized monomers, mainly isoprene, were recovered. The silicone effectively suppressed the foam and permitted a much more rapid strippling operation than was possible without the silicone.

Example 13

A 2500 g. portion of a polymerized emulsion, containing a chloroprene-acrylonitrile interpolymer and unpolymerized monomers dispersed in an acid solution of the sodium salts of the dinaphthylmethane sulfonate used in Example 12, was treated with 0.02% of silicone stopcock grease (based on the starting monomers), added as in Example 12. The treated latex was distilled without excessive foam formation at 20 to 50 mm. pressure, applying heat externally by a hot water bath. A total of 122 g. of unpolymerized monomers was recovered. In the absence of the silicone, foam filled the distilling flask, making it impossible to maintain a practical distillation rate.

Example 14

A 650 cc. portion of a latex of butadiene-vinyl pyridine interpolymer, containing approximately 25% solids (polymer) made in an alkaline solution of sodium oleate and sodium rosinate, was distilled at 70 to 80 mm. pressure at 50°–60° C. in the presence of 10 cc. of an emulsion of chloroprene-silicone stopcock grease made as described in Example 4. The silicone suppressed the foam formation during the distillation. 220 cc. of water and 6 cc. of a disagreeable smelling oil were removed from the latter, giving a product that was practically odorless.

Example 15

300 grams of a latex (known as GR–S III), containing 37.5% solids mostly composed of an interpolymer from a 50:50 mixture of butadiene and styrene emulsified in a potassium rosinate solution, was heated to 60° C. and subjected to a reduced pressure. A considerable amount of foam arose from the surface of the latex. When the same latex was treated with 0.28 cc. of the silicone emulsion described in Example 4 to give 0.01% silicone based on the solids content of the latex, the latex could be boiled at 126 mm. pressure in a water bath at 100° C. with little or no foam. The latex, which was readily concentrated to over 50% solids in this manner, had a definitely improved odor.

As illustrated in the examples, the efficiency of the polysilicone greases as anti-foaming agents may be improved by proper dispersion in emulsions, and, where chloroprene is employed as a water immiscible solvent, by aging the chloroprene solution of the polysilicones in the presence of an inhibitor for chloroprene polymerization. The concentrations of the solution, the composition of the emulsions, the method of treating the latex, and the distillation conditions used in the above examples, may, of course, be varied within wide limits, for the examples are not to be construed as limitations upon the invention or the manner in which it may be applied.

The solvent in which the polysilicone is dissolved may be any water immiscible organic solvent in which it is at least partly soluble. The insoluble portion, if any, is preferably broken up into a finely divided state and dispersed when used in the latex. Such organic solvents as benzene, toluene, butyl chloride, kerosene, chloroprene, ethyl acetate, and any other solvent in which solutions of the silicone may be obtained in concentrations of from 1% to 25% or higher, can be used. Ten per cent solutions of the silicone in organic solvents have been found very satisfactory for addition to the elastomer latices. The organic solvent solution of the silicone may be prepared as a water emulsion for treatment of the elastomer latices in a wide range of concentrations. Any of the dispersing agents which may be employed in the manufacture of the synthetic latices may be used for dispersing organic solvent solutions of the polymeric silicone in water. It is desirable to use soaps or other dispersing agents to stabilize the emulsions which have no (or a minimum) adverse effect on the latex or in the processes in which the latex may be employed. As illustrated, chloroprene (2-chlorobutadiene-1,3) is a convenient and economical solvent for the polymeric silicone, and is preferred for the purpose where a chloroprene polymer latex is being processed. The chloroprene employed as the solvent can be removed with the unpolymerized chloroprene present in such latex during the distillation step. In aging the chloroprene solution of the polymeric silicone, it is desirable to add an inhibitor of chloroprene polymerization such as phenothiazine, or other inhibitors such as disclosed in U. S. P. 1,950,438. The aging of the chloroprene solution of the silicone is preferably carried out at −15° to 30° C. for at least five days, although shorter times give an anti-foaming agent improved in its effectiveness over a solution which has been freshly prepared.

As illustrated in the above examples, the particle size of the aqueous dispersion of the silicone solution is an important factor in its effectiveness as an anti-foaming agent. The particles of the silicone solution should preferably be no smaller than 2 microns. The upper limit as to their size is less critical as long as they are not so large that the dispersion separates out too rapidly.

It has been found that, where the silicone emulsion is added to the latex before it is preheated for distillation and allowed to stand for several hours, it is still effective during the distillation of the volatile materials from the latex or in concentrating the latex.

The distillation may be carried out over a wide range of pressures and temperatures, although ordinarily it is preferred to work at reduced pressures since elevated temperatures frequently impair the properties of the latex. It is advantageous to reduce the pressure during the distillation to effect a flash distillation, which not only completes the concentration to a given solid content, but simultaneously cools the latex for storage without the application of external cooling. The dispersing of the silicones, and the aging of them when chloroprene is employed as the solvent, is also applicable where steam distillation is employed for removing the volatile organic constituents, as illustrated in Example 5.

From 0.002% to 0.1% of the polymeric dimethyl silicones (based on the weight of the elastomer) will be found to be effective for suppressing the foam during the heating or distillation of butadiene and chloroprene elastomer latices, particularly where the preferred procedures for its incorporation into the latices have been employed.

The synthetic elastomers in the latices to be treated may be polymers of butadiene-1,3, halogen butadiene-1,3 (haloprenes), or copolymers of these butadiene compounds with conjugated acyclic diene-hydrocarbons or other polymerizable compounds which are known to form rubber-like interpolymers, such as styrene, vinylidene chloride, vinyl ethynyl carbinols, acrylic and methacrylic esters and nitriles, and the like, and particularly to those in which the butadiene or halogen butadiene comprises at least 50% of the polymeric material. The dispersing agents employed in the preparation of the latices may be the soluble salts of the high molecular weight carboxylic or sulfonic acids, soluble sulfates of long chain aliphatic alcohols, or any other dispersing agent which may be found to be operable in the preparation of such latices. The latex with which the silicones may be used may either be acid or alkaline.

The term "elastomer" is used in this specification in the now generally accepted sense more particularly defined by Fisher in Ind. & Eng. Chemistry, volume 31, No. 8, Aug. 1939, pages 941–945.

The latices which have been treated with silicones as described may be used for any of the purposes for which silicone-free latices of the same concentration are suitable. Articles formed from the treated latices are more nearly odorless because of the distillation process which they have undergone. These articles have also a much reduced tendency to absorb water, when compared with articles of the same composition but containing no silicone. The treated latices themselves have, in general, a lower viscosity and a lower wetting power for certain surfaces. In cases where such lower viscosity and wetting power are not desired, the former may be increased by adding the common thickening agents and the latter increased by decreasing the pH of the latex (conveniently by the method of Livingston Serial No. 523,935, now abandoned), or by adding glycerine, casein, fatty acid soaps (including castor oil soaps), naphthenates, alkyl naphthalene sulfonates, soaps of long chain sulfates and sulfonates (such as those derived from methyl oleate), and the like.

We claim:

1. In the process for driving off volatile materials from synthetic elastomer latices prepared by emulsion polymerization of monomeric material comprised of at least 50% of a butadiene-1,3 compound in which foaming of the latex normally occurs, the step which comprises incorporating with the latex an aqueous emulsion of a water immiscible organic solvent solution of a stable polymeric dimethyl silicone of the class consisting of dimethyl silicone oils and greases in which the emulsion particles are at least 2 microns in size and the amount of the polymeric dimethyl silicone added being equal to from 0.002% to 0.1% of the weight of the elastomer in the latex.

2. In the process for driving off volatile materials from synthetic elastomer latices prepared by emulsion polymerization of monomeric material comprised of at least 50% of chloroprene in which foaming of the latex normally occurs, the step which comprises incorporating with the latex an aqueous emulsion of a chloroprene solution of a stable polymeric dimethyl silicone of the class consisting of dimethyl silicone oils and greases in which the emulsion particles are at least 2 microns in size and the amount of the polymeric dimethyl silicone added being equal to from 0.002% to 0.1% of the weight of the elastomer in the latex.

3. In the process for driving off volatile materials from synthetic elastomer latices prepared by emulsion polymerization of monomeric material comprised of at least 50% chloroprene in which foaming of the latex normally occurs, the step which comprises incorporating with the latex an aqueous emulsion of a chloroprene solution of a stable polymeric dimethyl silicone of the class consisting of dimethyl silicone oils and greases in which the emulsion particles are at least 2 microns in size, which emulsion has been prepared from a solution of the dimethyl silicone in chloroprene containing a chloroprene polymerization inhibitor, which solution has aged for at least five days, the amount of the polymeric dimethyl silicone added being equal to from 0.002% to 0.1% of the weight of the elastomer in the latex.

4. An aqueous emulsion of a chloroprene solution of a stable polymeric dimethyl silicone of the class consisting of dimethyl silicone oils and greases in which the emulsion particles are at least 2 microns in size.

5. A composition adapted for reducing foaming during the boiling of elastomer latices comprising an aqueous emulsion of a chloroprene solution of a stable polymeric dimethyl silicone of the class consisting of dimethyl silicone oils and greases in which the emulsion particles are at least 2 microns in size and which has been aged at least 5 days with a chloroprene polymerization inhibitor contained in it, prior to use as a foam inhibitor in such latices.

HERBERT W. WALKER.
RAYMOND W. MORROW.

REFERENCES CITED

The following references are of record in the file of this patent:

UNITED STATES PATENTS

| Number | Name | Date |
|---|---|---|
| 2,258,213 | Rochow | Oct. 7, 1941 |
| 2,286,763 | Rochow | June 16, 1942 |
| 2,362,052 | Craig | Nov. 7, 1944 |
| 2,375,007 | Larsen | May 1, 1945 |
| 2,379,268 | Zimmer | June 26, 1945 |

OTHER REFERENCES

Chemical and Engineering News, vol. 24, No. 9, May 10, 1946, pages 1233 and 1234.

Certificate of Correction

Patent No. 2,482,307 — September 20, 1949

HERBERT W. WALKER ET AL.

It is hereby certified that errors appear in the printed specification of the above numbered patent requiring correction as follows:

Column 1, line 45, for "unpolymeized" read *unpolymerized*; column 4, line 29, for "deordorized" read *deodorized*; line 40, after the word "making" insert a closing parenthesis; same line, for "later" read *latex*; column 5, line 33, for "0.6%" read *0.06%*; line 42, before "This" insert an opening parenthesis; column 6, line 3, for "strippling" read *stripping*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*

Certificate of Correction

Patent No. 2,482,307 September 20, 1949

HERBERT W. WALKER ET AL.

It is hereby certified that errors appear in the printed specification of the above numbered patent requiring correction as follows:

Column 1, line 45, for "unpolymeized" read *unpolymerized*; column 4, line 29, for "deordorized" read *deodorized*; line 40, after the word "making" insert a closing parenthesis; same line, for "later" read *latex*; column 5, line 33, for "0.6%" read *0.06%*; line 42, before "This" insert an opening parenthesis; column 6, line 3, for "strippling" read *stripping*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*